Feb. 26, 1952     H. H. REENTS     2,587,383
HOG HOLDER
Filed April 14, 1949
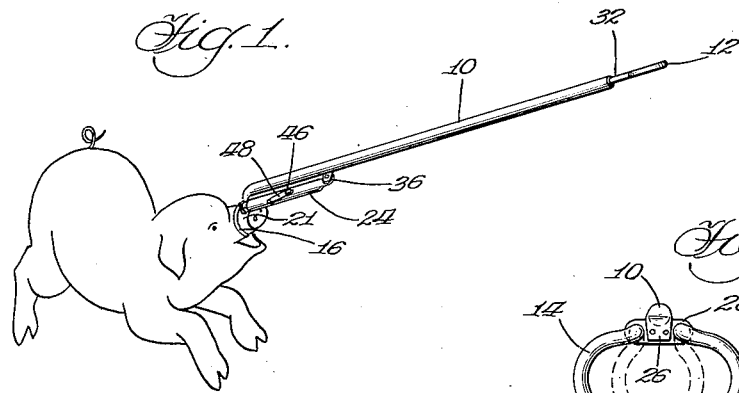
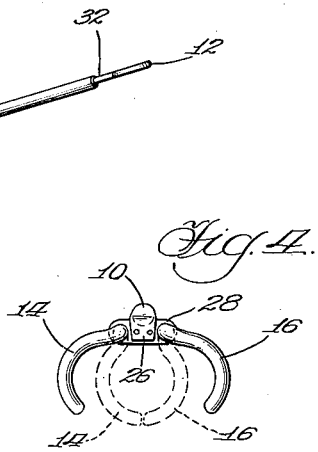
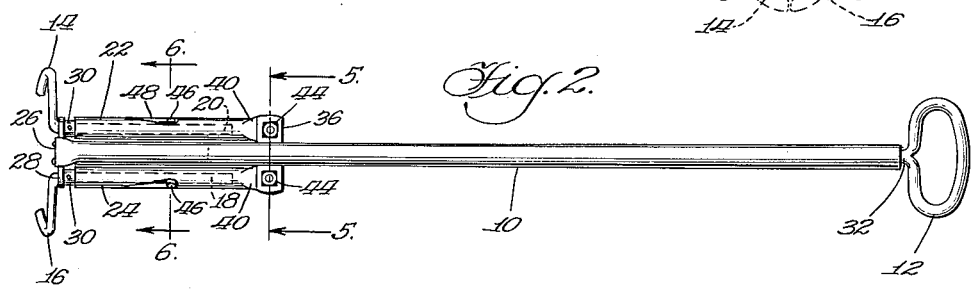
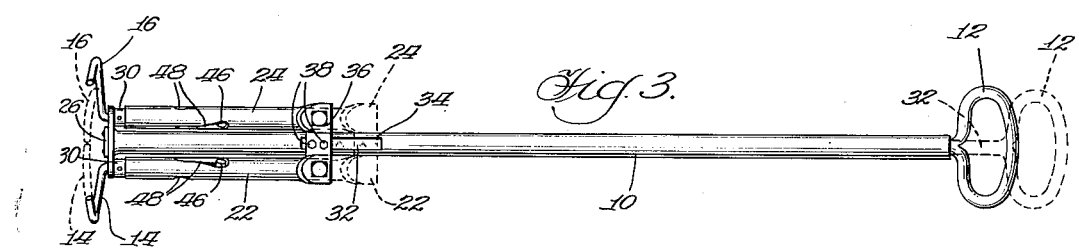
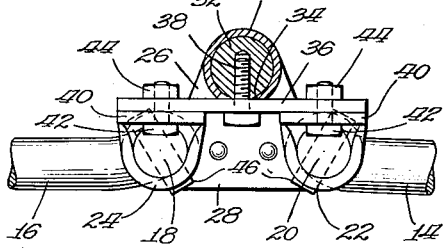
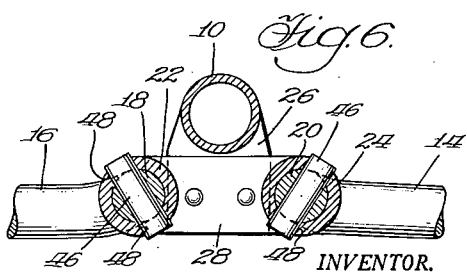
INVENTOR.
Heike H. Reents
BY
Donald H. Sweet
Atty Patented Feb. 26, 1952

2,587,383

UNITED STATES PATENT OFFICE 2,587,383

HOG HOLDER

Heike H. Reents, Havelock, Iowa

Application April 14, 1949, Serial No. 87,529

6 Claims. (Cl. 119—154)

My invention relates to animal husbandry and includes among its objects and advantages improved equipment suitable for holding hogs for ringing, and other uses.

In the accompanying drawings:

Figure 1 is a perspective view of a device according to the invention, in the position of use;

Figure 2 is a plan view of the same device looking down from above;

Figure 3 is a plan view looking upward from below;

Figure 4 is an end view from the holding end;

Figure 5 is an enlarged section on line 5—5 of Figure 2;

Figure 6 is an enlarged section on line 6—6 of Figure 2.

In the embodiment of the invention selected for illustration, the holder comprises a tubular staff 10, 32 inches long, holder means at one end, an operating handle 12 at the other end, and a transmission from the handle to the holder means.

The holder means proper comprises a pair of similarly shaped curved fingers 14 and 16, movable from the open position illustrated in Figure 4 partly or entirely to the dotted line position shown in the same figure. On reference to Figure 1, it will be obvious that movement to the proper degree towards the closed position will actuate fingers 14 and 16, to partly or completely encircle the nose or snout 21 of a pig or hog. If the animal's mouth is not open, the fingers will force themselves in from either side, and with the fingers far enough up to get behind the tusks, it becomes impossible for the animal to disengage itself. In Figure 1, the device is illustrated holding a small or medium-sized animal. With the same size tool, it is possible to hold much larger animals by turning the device the other side up and getting hold of the lower jaw.

The finger 14 has an integral axial extension 18, and finger 6 has a similar extension 20. These extensions are rotatably housed in sleeves 22 and 24.

The staff 10 is flattened, and a portion of it is turned down to form an ear, or lug 26 in a plane normal to the axis of the staff. A cross piece 28 is riveted to the lug 26, and apertured at its ends to receive the extensions 18 and 20. Axial movement of the fingers 14 and 16 and their extensions is prevented by collars 30. Beyond the collars 30, the extensions 18 and 20 lie in the torque tubes 22 and 24.

The handle 12 is connected to the tubes 22 and 24 by the pitman 32 telescoped in tube 10. Adjacent to the rear ends of the torque tubes, the staff tube 10 is slotted, as indicated in 34 in Figure 3. The cross connection 36 lies just below the staff 10 and is rigidly connected to the pitman 32, as by machine screws 38 passing through the slot 34. The rear ends of the torque tubes are flattened at 40 and bolted to the ends of the cross piece 36, as by bolts 42 and nuts 44.

The connection between the extension 18 and its torque tube 22 is a transverse pin 46, the projecting ends of which slide in diametrically opposite helical slots 48. The extension 20 is connected to its torque tube 24 in the same way, except that the slots are inclined in the opposite direction. As best illustrated in Figure 3, it will be obvious that moving the handle 12 from the full line position to the dotted line position will withdraw the torque tubes also to the dotted line position indicated in the drawing, moving the fingers 14 and 16 to the closed, dotted-line position shown in Figures 3 and 4.

The primary utility of the device is in connection with putting the conventional rings in the noses of such animals. In that respect it is a great labor saver on account of the peculiarities of the animal involved. When not forcibly gripped in some way, such an animal is extremely energetic, and it becomes a rather athletic feat for a man, or even two men, to succeed in holding even a medium-sized hog still enough to put a nose ring dependably in proper position. But when a relatively sensitive part of the animal is gripped in such a way that the animal quickly discovers that he is unable to free himself, he will pull directly away from the man in front of him and do substantially nothing else. Whether this is a matter of fear or some other instinct, I am not able to state. But the fact remains that with the animal held by one man equipped with a holder according to the invention, it is very easy for another man to place one or more rings in his nose.

Others may readily adapt the invention for use under various conditions of service. As at present advised with respect to the apparent scope of my invention, I desire to claim the following subject matter.

I claim:

1. A hog holder comprising, in combination: a tubular staff having a handle end and a holder end; two rigid approximately arcuate holding fingers; mountings on said staff for supporting said fingers at the holder end, for pivotal movement about axes parallel with said staff and offset laterally from each other a distance about equal to the radius of curvature of said fingers; each finger lying in a plane approximately normal to said staff, and having one end at its pivotal axis, and extending through an arc of about five-twelfths of a circle to terminate in a free end directed toward the other finger; each mounting comprising a tube parallel to said staff; an axial finger extension rotatable in said tube and integrally joined at its holder end to the adjacent end of its finger; and an irreversible transmission for swinging said fingers toward each other until their ends engage to define most of a rough circle, or back away from each other to leave an opening about twice as wide as the diameter of the circle defined by the closed fingers; said transmission including an operating handle at the handle end of said staff; said handle being movable axially of said staff to open and close said fingers, movement of said handle away from said fingers closing said fingers, and vice versa; and an operative connection between said handle and fingers comprising a rod integral with said handle and telescoped in said staff; a cross connection between the holder end of said rod and the proximate ends of said tubes, for moving said tubes axially with said handle and rod; said staff being slotted to leave clearance for said cross connection; two diametrically opposite helical slots in each tube; and a transverse pin in said finger extension, having its ends entered in said helical slots; the pitch angle of said slots being less than the slip angle, whereby axial force on said tubes is transmitted into twisting force on said extensions but not vice versa; said staff having a rigid cross piece at its extreme holder end, apertured to receive said extensions; said fingers abutting said cross piece to restrain axial movement in one direction; and collars on said extensions abutting the other side of said cross piece to restrain axial movement in the other direction.

2. A hog holder comprising, in combination: a tubular staff having a handle end and a holder end; two rigid approximately arcuate holding fingers; mountings on said staff for supporting said fingers at the holder end, for pivotal movement about axes parallel with said staff and offset laterally from each other a distance about equal to the radius of curvature of said fingers; each finger lying in a plane approximately normal to said staff, and having one end at its pivotal axis, and extending through an arc to terminate in a free end directed toward the other finger; each mounting comprising a tube parallel to said staff; an axial finger extension rotatable in said tube and integrally joined at its holder end to the adjacent end of its finger; and an irreversible transmission for swinging said fingers toward each other until their ends engage to define most of a rough circle, or back away from each other to leave an opening about twice as wide as the diameter of the circle defined by the closed fingers; said transmission including an operating handle at the handle end of said staff; said handle being movable axially of said staff to open and close said fingers, movement of said handle away from said fingers closing said fingers, and vice versa; and an operative connection between said handle and fingers comprising a rod integral with said handle and telescoped in said staff; a cross connection between the holder end of said rod and the proximate ends of said tubes, for moving said tubes axially with said handle and rod; said staff being slotted to leave clearance for said cross connection; each tube having helical slot means therein; and a transverse pin in said finger extension, having an end entered in said helical slot means; the pitch angle of said slot means being less than the slip angle, whereby axial force on said tubes is transmitted into twisting force on said extensions but not vice versa; said extensions being free to rotate but restrained against axial movement.

3. A hog holder comprising, in combination: a tubular staff having a handle end and a holder end; two rigid approximately arcuate holding fingers; mounting means on said staff for supporting said fingers at the holder end, for pivotal movement about axes parallel with said staff and offset laterally from each other a distance about equal to the radius of curvature of said fingers; each finger lying in a plane approximately normal to said staff, and having one end at its pivotal axis, and extending through an arc to terminate in a free end curved toward the other finger; each mounting comprising a tube parallel to said staff; an axial finger extension rotatable in said tube and integrally joined at its holder end to the adjacent end of its finger; and an irreversible transmission for swinging said fingers toward each other until their ends engage to define most of a rough circle, or back away from each other to leave an opening about twice as wide as the diameter of the circle defined by the closed fingers; said transmission including an operating handle at the handle end of said staff; said handle being movable axially of said staff to open and close said fingers, movement of said handle away from said fingers closing said fingers, and vice versa; and an operative connection between said handle and fingers comprising a rod integral with said handle and telescoped in said staff; a cross connection between the holder end of said rod and the proximate ends of said tubes, for moving said tubes axially with said handle and rod; said staff being slotted to leave clearance for said cross connection; and irreversible connections for transmitting axial movement of said tubes into rotary movement of said fingers; said fingers having smooth rounded tips and smooth side portions adjacent their tips.

4. A hog holder comprising, in combination: a tubular staff having a handle end and a holder end; two rigid approximately arcuate holding fingers; mounting means on said staff for supporting said fingers at the holder end, for pivotal movement about axes parallel with said staff and offset laterally from each other; each finger lying in a plane approximately normal to said staff, and having one end at its pivotal axis, and extending through an arc to terminate in a free end curved toward the other finger; each mounting comprising a tube parallel to said staff; an axial finger extension rotatable in said tube and integrally joined at its holder end to the adjacent end of its fingers; and an irreversible transmission for swinging said fingers toward each other until their ends engage to define most of a rough circle, or back away from each other to leave an opening; said transmission including an operating handle at the handle end of said staff; said handle being movable axially of said staff to open and close said fingers, movement of said handle away from said fingers closing said fingers, and vice versa; said fingers having smooth rounded tips and smooth side portions adjacent their tips.

5. A hog holder comprising, in combination: a tubular staff having a handle end and a holder end; two rigid approximately arcuate holding fingers; mounting means on said staff for supporting said fingers at the holder end, for pivotal movement about axes parallel with said staff; each finger lying in a plane approximately normal to said staff, and having one end at its pivotal axis, and extending through an arc to terminate in a free end curved toward the other finger; and an irreversible transmission for swinging said fingers toward or back away from each other; said transmission including an operating handle at the handle end of said staff; said fingers having smooth rounded tips and smooth side portions adjacent their tips.

6. A hog holder comprising, in combination: a staff having a handle end and a holder end; two rigid approximately arcuate holding fingers; mounting means on said staff for supporting said fingers at the holder end, for pivotal movement in a plane approximately normal to said staff; each finger lying in its plane of pivotal movement to terminate in a free end curved toward the other finger; and an irreversible transmission for swinging said fingers toward or back away from each other; said transmission including an operating handle at the handle end of said staff; said fingers having smooth rounded tips and smooth side portions adjacent their tips.

HEIKE H. REENTS.

REFERENCES CITED

The following references are of record in the file of this patent:

UNITED STATES PATENTS

| Number | Name | Date |
|---|---|---|
| 521,208 | Day et al. | June 12, 1894 |
| 918,613 | Upton | Apr. 20, 1909 |
| 1,659,701 | Pocha | Feb. 21, 1928 |
| 1,692,077 | Cochran | Nov. 20, 1928 |
| 1,709,615 | Fordham | Apr. 16, 1929 |
| 2,060,366 | Dunlap | Nov. 10, 1936 |